United States Patent [19]
Edwards et al.

[11] Patent Number: 5,745,173
[45] Date of Patent: Apr. 28, 1998

[54] MACHINE VISION CAMERA AND VIDEO PREPROCESSING SYSTEM

[76] Inventors: Michael Kenneth Edwards, 10602 Piping Rock; Paul Howard Mayeaux, 10606 Piping Rock, both of Houston, Tex. 77042

[21] Appl. No.: 340,053

[22] Filed: Nov. 15, 1994

Related U.S. Application Data

[62] Division of Ser. No. 282,169, Jul. 28, 1994, Pat. No. 5,438,360, which is a continuation of Ser. No. 942,203, Sep. 8, 1992, abandoned.

[51] Int. Cl.$^6$ .............................. H04N 5/228; H04N 7/18
[52] U.S. Cl. .................. 348/208; 348/33; 348/143; 348/222; 382/270; 382/274
[58] Field of Search ........................ 382/132, 169, 382/270, 273, 274; 348/207, 208, 222, 223, 234, 237, 266, 272, 273, 33, 47, 48, 143; H04N 5/228, 7/18

[56] References Cited

U.S. PATENT DOCUMENTS

| | | | |
|---|---|---|---|
| 5,001,348 | 3/1991 | Dirscherl et al. | 250/372 |
| 5,161,107 | 11/1992 | Mayeaux et al. | 364/436 |
| 5,221,963 | 6/1993 | Hashimoto et al. | 358/209 |
| 5,278,663 | 1/1994 | Hong | 358/335 |
| 5,388,138 | 2/1995 | Fujiwara | 378/108 |
| 5,389,918 | 2/1995 | Kusaka et al. | 348/699 |
| 5,436,662 | 7/1995 | Nagasaki et al. | 348/312 |
| 5,479,204 | 12/1995 | Iwamatsu | 348/96 |
| 5,493,622 | 2/1996 | Tsuchino et al. | 382/132 |
| 5,497,191 | 3/1996 | Yoo et al. | 348/208 |

OTHER PUBLICATIONS

Sklar, *Digital Communications: Fundamentals and Applications*; Prentice Hall; 1988; pp. 74–78.

*Primary Examiner*—Andrew Faile
*Assistant Examiner*—Ngoc-Yen Vu
*Attorney, Agent, or Firm*—Conley, Rose & Tayon; Jeffrey C. Hood

[57] ABSTRACT

An improved camera system intended for a machine vision system which produces an image output that is specially adapted to be received by a machine vision system. In one embodiment, the camera system receives components from three portions of the electromagnetic spectrum, these being infrared, visible, and ultraviolet, and then combines these three portions essentially as expanded colors in an expanded version of an RGB "red/green/blue" video system. This provides a better image in all types of weather and visibility conditions. In addition, the camera system includes dynamic range transform logic which selectively compresses the dynamic range of the respective pixel values comprising the image to extract the most useful information from the extended dynamic range of the image. This reduces the amount of information required to be processed while retaining a quality image. The camera system also includes motion compensation logic that removes the motion or jitter caused by the camera system being subject to vibration from various environmental influences. The system also optionally removes stationary background features from the output image.

17 Claims, 12 Drawing Sheets

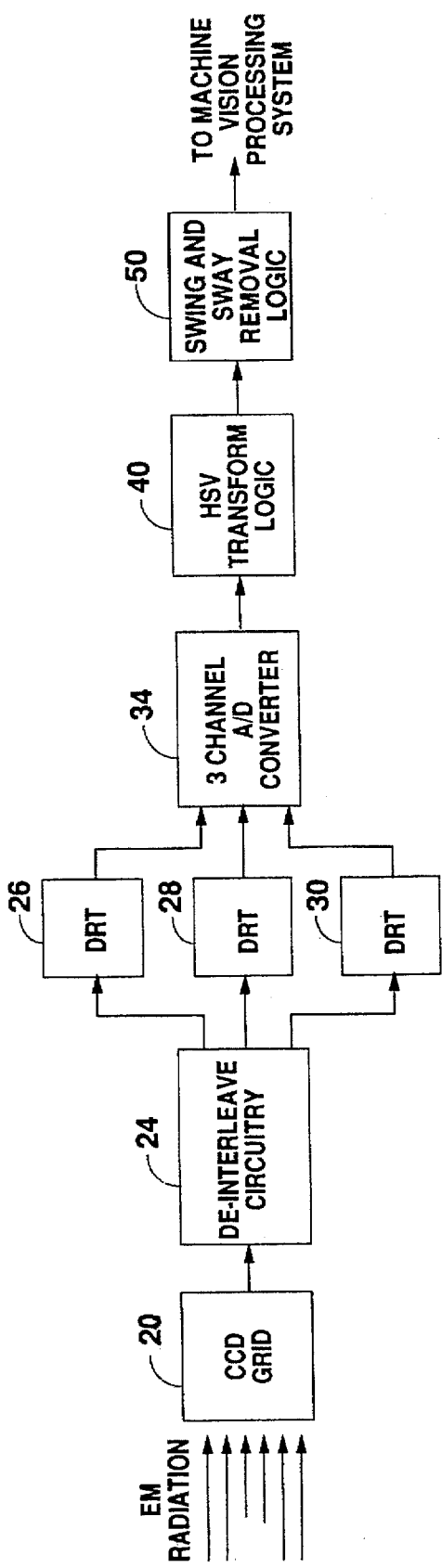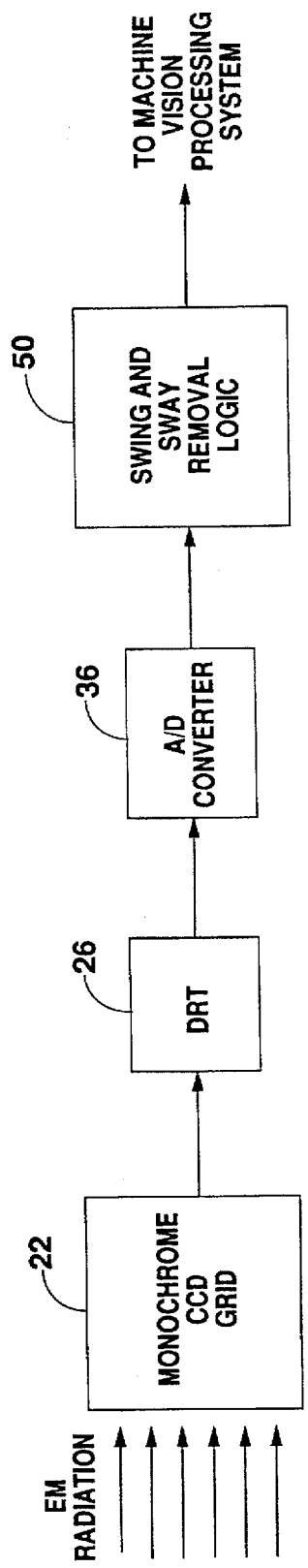

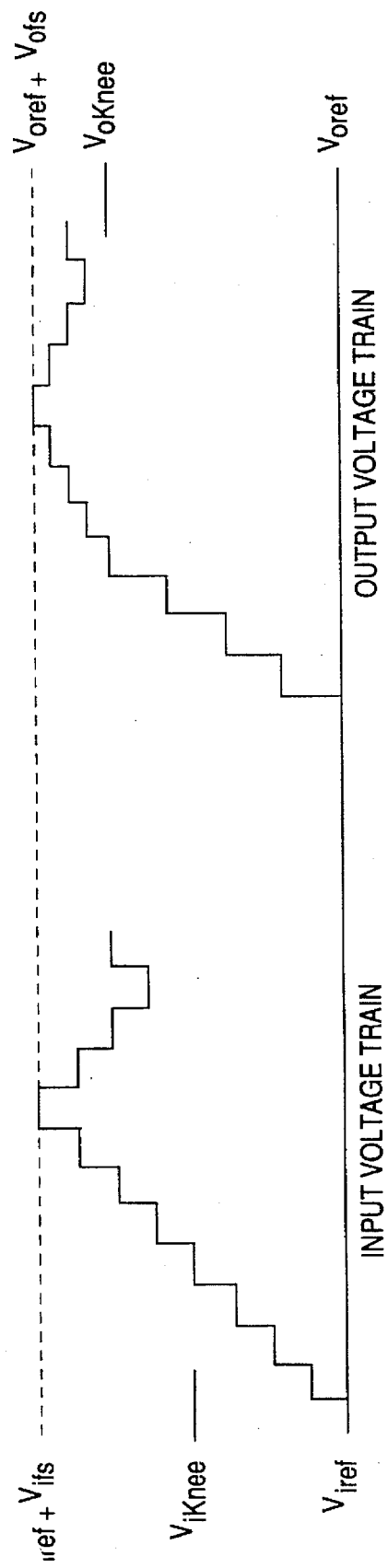

MACHINE VISION CAMERA AND VIDEO PREPROCESSING SYSTEM

This is a division of application Ser. No. 08/282,169 filed on Jul. 28, 1994, now U.S. Pat. No. 5,438,360, which was a continuation of U.S. patent application Ser. No. 07/942,203 filed Sep. 8, 1992 which has been abandoned.

BACKGROUND OF THE INVENTION

1. Field of the Invention

The present invention relates to an improved machine vision camera and video preprocessing system which receives electromagnetic radiation from a field of view, selectively compresses the dynamic range of the image, and processes the image to remove the effects of camera jitter to provide an output adapted for a machine vision system.

2. Description of the Related Art

A current area of research involves interpreting video images through image processing or "machine vision." This technique uses specialized image processing hardware and software to analyze a received image and extract the information needed for control and/or surveillance. In spite of major efforts to develop machine vision systems for different applications, workable, cost effective devices having the capabilities and performance required for practical applications have been elusive.

One area of research has involved providing a clear image to the machine vision processing system during varying weather and visibility conditions. For example, conventional machine vision systems which receive electromagnetic radiation from a preset frequency range in the EM spectrum do not operate well when visibility conditions are such that reception of this preset frequency range does not produce a clear image. Therefore, an improved camera system is desired which produces a clear image during all visibility and weather conditions.

Another aspect of machine vision systems regards the necessity for real-time processing and the large amounts of information that must be processed. The information in the scene within the camera's field of view may have a wide dynamic range equivalent to a large number of bits of resolution. Conventional linear sampling requires many bits of resolution to accommodate this extensive dynamic range while also providing the granularity or detail of information required of the system. Due to the difficulties in processing such large amounts of information, various techniques have been used to select the most useful portion of the dynamic range of the image and thus reduce the amount of information that must be processed. One technique involves merely clipping off some portion of the dynamic range of the image, either the top or bottom brightness levels of the image, to reduce the amount of information that must be processed. However, this technique may present problems because important information may be lost. Therefore, a method and apparatus is desired which selectively compresses the dynamic range of the respective pixel values comprising an image to extract the most useful information from the extended dynamic range of the image.

Another problem associated with the use of machine vision systems has been environmentally induced motion in the camera system. When a camera is attached to an imperfectly rigid structure or is incorporated into a machine, the camera will inevitably be subject to various vibrations and jitter. This camera motion results in apparent motion in stationary portions of the image. This jitter, while not causing problems to humans, creates difficulties in a machine vision system in attempting to detect and track objects within its field of view. Therefore, an improved method and apparatus is desired which is capable of removing the jitter caused by the instability of the camera system.

For background on motion analysis in machine vision systems, please see Mallot et al., "Inverse perspective mapping simplifies optical flow computation and obstacle detection," Biological Cybernetics Vol. 64 (1991), pp. 177–185. The Mallot reference teaches computation of localized motion from successive video images. The method taught in Mallot is not concerned with, and is unsuitable for, determining a global motion component representing displacement between successive images.

SUMMARY OF THE INVENTION

The present invention comprises a camera system intended for a machine vision system which produces an image output that is specially adapted to be received by a machine vision system. The camera system receives components from three portions of the electromagnetic spectrum, these being infrared, visible, and ultraviolet, and then combines these three portions essentially as expanded colors in an expanded version of an RGB "red/green/blue" video system. Thus, these three frequency portions are combined to form one image. This provides a better image in all types of weather and visibility conditions. In addition, the camera system includes separate dynamic range transform logic for each image component which varies the gain for each pixel to reduce the amount of information required to be processed while retaining a quality image. The camera according to the present invention also includes motion compensation logic that removes the effect of motion or jitter caused by the camera system being subject to vibration from various environmental influences. The motion compensation logic also optionally removes stationary background features to simplify motion-oriented processing. The dynamic range transform and/or motion compensation features may also be incorporated into a video preprocessing system independent of the nature of the video source.

The present invention comprises a CCD grid with associated logic circuitry that receives electromagnetic radiation from a field of view. The CCD grid includes pixel location receptors which receive the infrared, visible, and ultraviolet portions of the EM spectrum as red/green/blue portions of the respective pixel. The CCD grid outputs a pulse train that comprises interleaved infrared, visible, and ultraviolet pulses for each respective pixel in the CCD grid. This pulse train is provided to de-interleave circuitry which separates the respective pulses into component portions of the infrared, visible, or ultraviolet spectrum. In an alternate embodiment, the CCD grid is monochrome in nature, each pixel possessing the same spectral response, and therefore no de-interleave circuitry is required.

These pulses are provided to respective dynamic range transform logic circuitry which selectively compands the dynamic range of each pixel value, i.e., automatically varies the gain for each pixel. The DRT logic expands the lower portion of the range of pixel values and compresses the remainder to selectively compand the dynamic range of each respective pixel. The restriction of the dynamic range of the respective pixel values to the most useful region reduces the amount of information that must be processed and enables use of an 8-bit A/D converter as opposed to a 12-bit or 16-bit A/D converter. This permits real-time processing of the respective image in hardware of reduced complexity and cost, which is necessary in practical machine vision systems.

The output of each of the respective dynamic range transform circuits is provided through respective channels of an A/D converter to a logic block which transforms these digital signals into hue/saturation/value (HSV) components. Either or both of the saturation and value components are provided to motion compensation logic according to the present invention and are recombined with the hue component to provide a motion-stabilized three component video output. Alternately, the monochrome version of the system utilizes a single-channel A/D converter and provides a motion-stabilized grayscale video output.

The motion compensation logic utilizes an accumulated background image, which is stored in a background frame buffer, as well as the current incoming frame in order to compute the amount of translation needed to eliminate the effects of camera motion or jitter. The incoming frame is logically partitioned into a number of blocks, and the method takes each incoming pixel as it arrives in raster-scan sequence from the HSV logic and utilizes a plurality of different relative displacement guesses from an initial displacement guess to select pixels in the background image for comparison. The incoming pixels are compared with background pixels from different positions in the image, wherein the difference of position between the incoming pixel and the background pixel is the total displacement guess as to the amount of image shift that has occurred since the previous frame. The relative displacement guesses that are applied to the initial displacement guess are repeated for each of the logical blocks comprising the image.

By using a different relative displacement for each incoming pixel in a logical block, and then repeating these relative displacements for the various logical blocks in the image, a range of pixel value differences or error values is computed for each relative displacement over the entire image. The pixel value differences computed for the respective relative displacements in each logical block are accumulated into an error matrix. This error matrix is then analyzed to determine which relative displacement, when added to the initial displacement guess, results in the best fit of the new frame to the stored background, thus providing the correct amount of translation to align the new frame. A second pass over the frame generates the translated (motion compensated) output frame and updates the stored background. Background features are optionally removed during this translation step. The output frame is made available to a machine vision system through a random-access frame buffer interface.

Therefore, a method and apparatus is provided to receive electromagnetic radiation, i.e., an image, and provide an output that is designed to be received by a machine vision processing system. The camera system receives different portions of the EM spectrum, these being infrared, visible, and ultraviolet and then uses these different portions as red/green/blue aspects to form a single image. The dynamic range of each of these components is selectively compressed to reduce the amount of processing required while not losing valuable information. A motion compensation algorithm is then applied to the image to remove the effects caused by jitter or environmental effects on the camera system. Stationary features are optionally removed during this motion compensation stage. The resulting output is an image that can be readily used by a machine vision system for object detection, recognition, and tracking.

BRIEF DESCRIPTION OF DRAWINGS

A better understanding of the present invention can be obtained when the following detailed description of the preferred embodiment is considered in conjunction with the following drawings in which:

FIG. 1 is a block diagram of the machine vision camera system according to the present invention;

FIG. 2 is a block diagram of a monochrome version of the machine vision camera system according to the present invention;

FIG. 4 illustrates a sample input voltage train and the corresponding output voltage train companded by the dynamic range transform logic of FIGS. 1 and 2;

DETAILED DESCRIPTION OF THE PREFERRED EMBODIMENT

Figure 3:
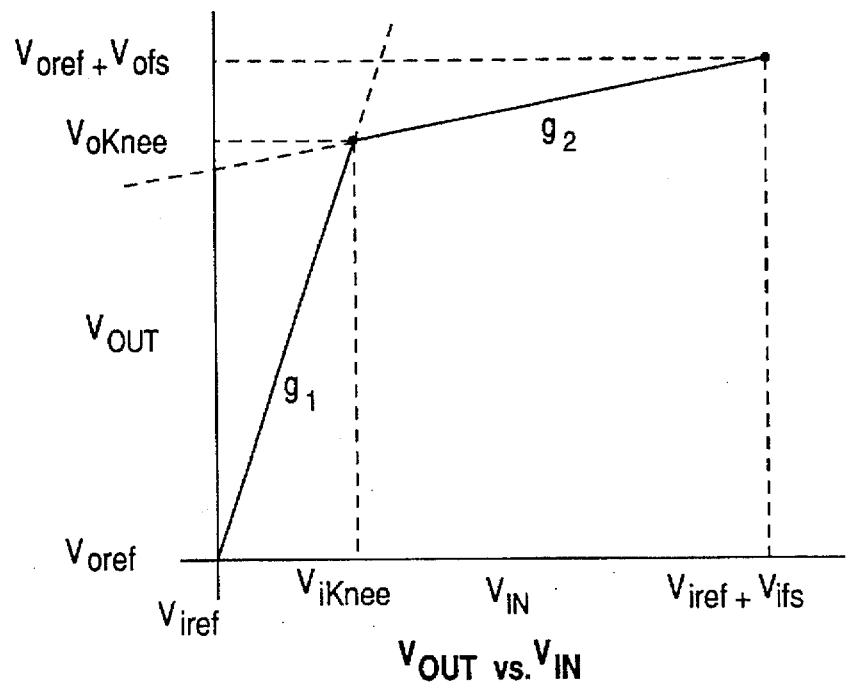
FIG. 3 is a graph illustrating operation of the dynamic range transform (DRT) logic of FIGS. 1 and 2.

Referring now to FIG. 1, a block diagram of the camera system according to the present invention is shown. The camera system includes a CCD (charge coupled device) grid 20 which includes a plurality of pixel locations for receiving electromagnetic radiation reflected from a scene or field of view. The CCD grid 20 is preferably a custom version of the KAI0370NI, produced by Eastman Kodak Corporation (Kodak), with a pattern of frequency range sensitivity striping comparable to that of the Kodak KAI0370C. In a normal configuration, each pixel comprised in the CCD grid 20 would include red, green, and blue components. However, in the preferred embodiment of the invention, each pixel location in the CCD grid 20 includes infrared, visible, and ultraviolet receptors comprising each pixel. The CCD grid 20 outputs a voltage level train for each pixel where each level in the level train output from the CCD grid 20 represents either an infrared, visible, or ultraviolet component of a respective pixel.

The pulse train is provided to de-interleave circuitry 24, which separates the pulse train into its corresponding infrared, visible, and ultraviolet components. The de-interleave logic 24 has three outputs that are provided to three dynamic range transform (DRT) circuits 26, 28, and 30, as shown. The de-interleave circuitry 24 provides infrared pulses to the DRT circuit 26, provides the pulses corresponding to the visible portion of the image to the DRT circuit 28, and provides the ultraviolet pulses to the DRT circuit 30. Each respective dynamic range transform circuit adjusts the dynamic range of each of the respective signals to selectively compress the dynamic range of each of the signals. By selectively compressing the dynamic range of each of these signals in this manner, a reduced number of bits are required to convey the information comprising the image.

The outputs from each of the DRT circuits 26, 28, and 30 are provided to respective channels of a three channel video analog to digital (A/D) converter 34. The A/D converter 34 is preferably the Bt254 produced by Brooktree. The output of the A/D converter 34 is provided to HSV (hue saturation value) transform logic 40 which converts each of the infrared, visible, and ultraviolet signals output from the A/D converter 34 into the HSV color scheme. The HSV transform logic 40 is preferably the Bt281 color space converter produced by Brooktree. Either or both of the saturation and value components output from the HSV logic 40 are provided to motion compensation logic 50 according to the present invention which adjusts these components to remove jitter caused by vibration of the camera system and optionally removes stationary features. The hue component is delayed and recombined with the saturation and value components to produce a three component output of the camera system to a machine vision processing system (not shown).

Referring now to FIG. 2, a monochrome version of the camera system is shown. Elements which are identical to those in FIG. 1 utilize the same reference numbers. The camera system according to this embodiment includes a monochrome CCD grid 22 which receives EM radiation from a scene or field of view. The monochrome CCD grid 22 is preferably a custom version of the KAI0370NI, produced by Kodak, with extended frequency range blocking in its dark pixel area to provide useability in the infrared spectrum.

The CCD grid 22 outputs a pulse train to DRT logic 26 which adjusts the dynamic range of each of the respective signals to selectively compress the dynamic range of each of the signals as described above. The DRT logic 26 provides its output to a single channel A/D converter 36 which in turn provides a digital output to the motion compensation logic 50. The A/D converter 36 is preferably the Bt252 produced by Brooktree. The output image from the motion compensation logic is then provided to a machine vision processing system (not shown).

Dynamic Range Transform Logic

Referring now to FIG. 3, a diagram illustrating the operation of the dynamic range transform (DRT) logic 26 is shown. Since the operation of DRT circuits 26, 28, and 30 is identical, DRT circuit 26 is discussed for simplicity. The diagram represents a plot of the desired output level $V_{OUT}$ for an input pixel voltage $V_{IN}$. The input voltage train ranges from voltage $V_{iref}$ to $V_{iref}+V_{ifs}$, and the outgoing voltage train companded by the DRT ranges from $V_{oref}$ to $V_{oref}+V_{ofs}$. The voltage $V_{iref}$ represents the reference input voltage, +6 volts in the preferred embodiment. The voltage $V_{ifs}$ represents the full scale of the input voltage, preferably +1 volt. Thus the voltage $V_{iref}$ represents the minimum input voltage, i.e., +6 volts, provided to the DRT logic 26 and voltage $V_{iref}+V_{ifs}$, i.e. +7 volts, represents the maximum input voltage provided to the DRT logic 26. The voltage $V_{oref}$ represents the reference output voltage, 0 volts or ground in the preferred embodiment. The voltage $V_{ofs}$ represents the full scale of the output voltage, preferably +1 volt. Thus the voltage $V_{oref}$ represents the minimum output voltage, 0 volts, output from the DRT logic 26, and voltage $V_{oref}+V_{ofs}$, +1 volt, represents the maximum output voltage output from the DRT logic 26.

As shown, the DRT logic 26 amplifies input pixel values below a "knee" point, referred to as $V_{iknee}$, with a gain of $g_1$, ranging between ($V_{ofs}/V_{ifs}$) and (G·($V_{ofs}/V_{ifs}$)) where G is discussed below with reference to FIGS. 5 and 7. Input pixel values above $V_{iknee}$ are related to the output voltage by a linear segment with an incremental gain of $g_2$, ranging between 0 and ($V_{ofs}/V_{ifs}$). The intermediate gain ($g_1$/G) and the incremental gain $g_2$ are set by varying external control voltages referred to as $V_{g1}$ and $V_{g2}$. In the preferred embodiment, $V_{g1}$ and $V_{g2}$ are set by a microcontroller (not shown) based on lighting and visibility conditions.

FIG. 4 illustrates a sample train of input levels and the corresponding train of output levels companded by the DRT logic 26. As shown, the DRT logic 26 receives the train of input levels and selectively expands pixel value differences below $V_{iknee}$ and compresses pixel value differences above $V_{iknee}$, to produce the train of output levels as shown.

The DRT logic 26 operates on the principle that the most useful information is below the knee value $V_{iknee}$, a parameter dependent upon lighting and visibility conditions. Thus, these pixel values are expanded to occupy a larger proportion of the A/D converter's dynamic range, while the less useful dynamic range above the knee value is compressed to occupy a lesser proportion of the A/D converter's dynamic range. The dynamic range of the train of pixel values generated by the CCD 20 or 22 is generally greater than the resolution of the A/D converter 34 or 36 for high speed, cost-effective graphics processing hardware. Thus, much of the dynamic range of the input signal is lost in the sampling that occurs within the A/D converter 34 or 36. If, as is the case in nighttime video, the distribution of useful information is uneven, selectively companding the input signal enables more efficient usage of A/D resolution and thus permits use of a narrower data path and thus less precise, less costly hardware. The most useful information is expanded, while the least useful information is compressed to efficiently exploit the resolution of A/D converter 34 or 36.

Figure 5:
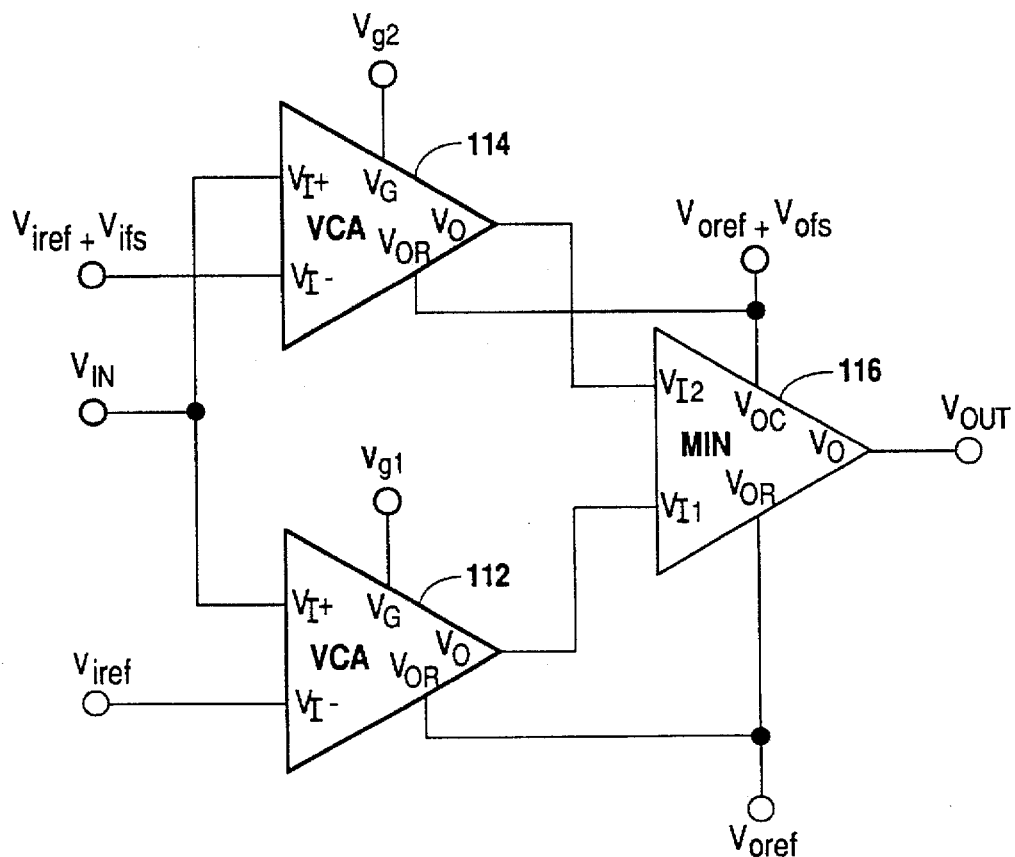
FIG. 5 is a block diagram illustrating the dynamic range transform logic of FIGS. 1 and 2.

Referring now to FIG. 5, a block diagram illustrating the DRT circuit 26 is shown. As mentioned above, the DRT circuits 26, 28, and 30 operate in identical manner, and the DRT circuit 26 is discussed for simplicity. The DRT circuit 26 utilizes the four fixed reference voltages $V_{iref}$, $V_{iref}+V_{ifs}$, $V_{oref}$ and $V_{oref}+V_{ofs}$, discussed previously in FIG. 3. In the preferred embodiment, $V_{iref}$ is +6 volts, $V_{ifs}$ is +1 volt, $V_{oref}$ is 0 volts, and $V_{ofs}$ is +1 volt. The DRT circuit 26 also includes two parameter settings referred to as $V_{g1}$ and $V_{g2}$ which are used to select the respective incremental gains ($g_1$/G) and $g_2$ and position the knee, i.e., $V_{iknee}$ and $V_{oknee}$. The DRT logic 26 receives the signal voltage $V_{IN}$ output from either the de-interleave circuitry 24 in FIG. 1 or the monochrome grid 22 in FIG. 2 and provides the output signal voltage $V_{OUT}$.

The DRT circuit 26 includes two voltage-controlled amplifiers 112 and 114. The reference voltage $V_{iref}$ is connected to the $V_{I-}$ input of the voltage-controlled amplifier 112. The reference voltage $V_{iref}+V_{ifs}$ is connected to the $V_{I-}$ input of the second voltage-controlled amplifier 114. The input voltage $V_{IN}$ is connected to the $V_{I+}$ inputs of the voltage-controlled amplifiers 112 and 114. The voltage-controlled amplifiers 112 and 114 receive parameter voltages $V_{g1}$ and $V_{g2}$, respectively, at their $V_G$ inputs. The voltage-controlled amplifier 112 receives reference voltage $V_{OR}=V_{oref}$ and the voltage-controlled amplifier 114 receives reference voltage $V_{OR}=V_{oref}+V_{ofs}$.

The voltage-controlled amplifier 112 multiplies the voltage ($V_{IN}-V_{iref}$) by the ratio of the parameter voltage $V_{g1}$ to the unity gain setting $V_{u1}$ characteristic of the voltage-controlled amplifier 112. This result is added to the reference voltage $V_{oref}$ and supplied as the output $V_O$ of the voltage-controlled amplifier 112. The voltage-controlled amplifier 114 multiplies the voltage ($V_{IN}-(V_{iref}+V_{ifs})$) by the ratio of the parameter voltage $V_{g2}$ to the unity gain setting $V_{u2}$ characteristic of the voltage-controlled amplifier 114. This (negative) result is added to the reference voltage $V_{oref}+V_{ofs}$ and supplied as the output $V_O$ of the voltage-controlled amplifier 114.

The outputs $V_O$ of the voltage-controlled amplifiers 112 and 114 are provided to inputs $V_{I1}$ and $V_{I2}$, respectively of minimum determination logic 116. The minimum determination logic 116 receives the reference voltages $V_{OR}=V_{oref}$ and $V_{OC}=V_{oref}+V_{ofs}$. The minimum determination logic 116 multiplies its input signal voltage ($V_{I1}-V_{oref}$) by gain factor G and passes the lesser of this quantity and input signal voltage ($V_{I2}-V_{oref}$) as its output signal ($V_{OUT}-V_{oref}$). The minimum voltage is gain factor G times the output of voltage-controlled amplifier 112 for input voltages less than the input knee value $V_{iknee}$, and the minimum voltage is the output of voltage-controlled amplifier 114 for input voltages greater than $V_{iknee}$.

Figure 6:
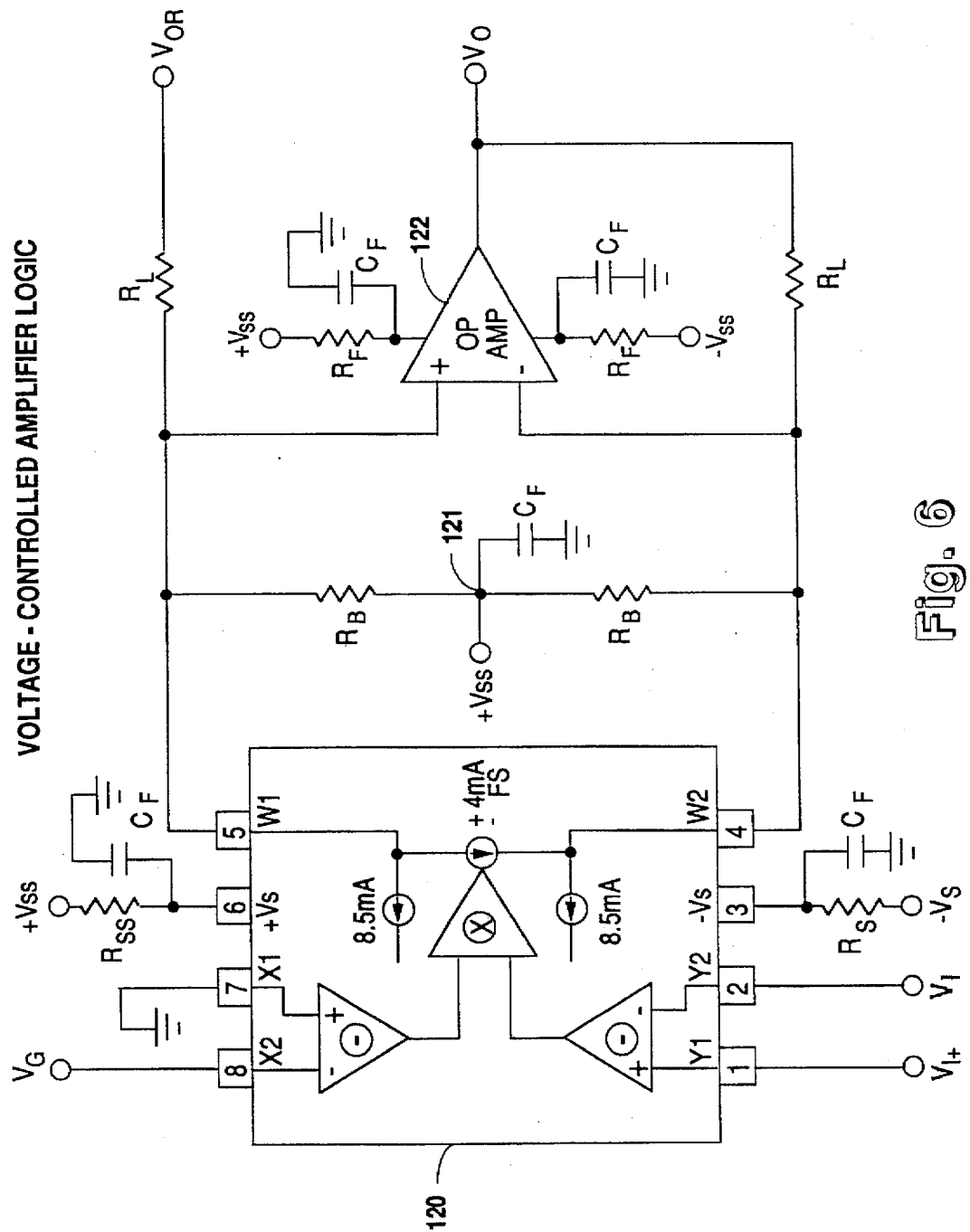
FIG. 6 illustrates a voltage-controlled amplifier of FIG. 5.

Referring now to FIG. 6, a diagram illustrating the voltage-controlled amplifier logic 112 is shown. The voltage-controlled amplifiers 112 and 114 are identical in internal operation, and thus the voltage-controlled amplifier 112 is described for simplicity. The voltage-controlled amplifier 112 preferably comprises an AD834 Four-Quadrant Multiplier supplied by Analog Devices. For more information on the AD834, please see the AD834 datasheet, AD application note AN-212 ("Using the AD834 in DC to 500 MHz Applications"), and Chapter IX of the *Amplifier Applications Guide*, all published by Analog Devices. These documents are hereby incorporated by reference.

The AD834 analog multiplier 120 includes 8 pins labeled 1–8, corresponding respectively to signal and supply terminals Y1, Y2, $-V_S$, W2, W1, $+V_S$, X1, and X2. Pins 1 (Y1) and 2 (Y2) receive differential input signal voltages $V_{I+}$ and $V_{I-}$, respectively. Pins 8 (X2) and 7 (X1) receive gain-control voltage $V_G$ and signal ground, respectively. Pin 3 ($-V_S$) is connected through a resistor $R_S$ to supply voltage $-V_S$, preferably $-5$ volts. The node between pin 3 and resistor $R_S$ is also connected through a capacitor $C_F$ to ground. Pin 6 ($+V_S$) is connected through a resistor $R_{SS}$ to supply voltage $+V_{SS}$, preferably $+15$ volts. The node between pin 6 and resistor $R_{SS}$ is also connected through a capacitor $C_F$ to ground.

Pin 4 (W2) of the AD834 analog multiplier 120 is connected through a resistor $R_B$ to node 121. Pin 5 (W1) is connected through a second resistor $R_B$ to node 121. Node 121 is connected to supply voltage $+V_{SS}$, preferably $+15$ volts, and through a capacitor $C_F$ to ground. Pins 4 and 5 are also connected to the inverting and non-inverting inputs, respectively, of an operational amplifier (op amp) 122. The op amp 122 is preferably the AD811 supplied by Analog Devices. For information on this op amp, please see the AD811 data sheet (published by Analog Devices), which is hereby incorporated by reference. The non-inverting input of the op amp 122 is connected through a resistor $R_L$ to reference voltage $V_{OR}$. The inverting input of the op amp 122 is connected through a second resistor $R_L$ to the output of the op amp 122, which provides output signal voltage $V_O$. The positive supply of the op amp 122 is connected through a resistor $R_F$ to supply voltage $+V_{SS}$, preferably $+15$ volts. The node between the positive supply of the op amp 122 and resistor $R_F$ is also connected through a capacitor $C_F$ to ground. The negative supply of the op amp 122 is connected through a resistor $R_F$ to supply voltage $-V_{SS}$, preferably $-15$ volts. The node between the negative supply of the op amp 122 and resistor $R_F$ is also connected through a capacitor $C_F$ to ground.

The AD834 provides a signal current $I_P$ between open-collector outputs W1 and W2, superimposed on a bias current $I_B$ of approximately 8.5 mA into each output pin. The transfer function of the AD834 is:

$$I_P=(V_{X1}-V_{X2})\cdot(V_{Y1}-V_{Y2})\cdot 4$$

where $I_P$ is in mA and $V_{X1}$, $V_{X2}$, $V_{Y1}$ and $V_{Y2}$ are in volts. In this application, the polarity of the gain-control voltage and therefore of the output current-to-voltage converter is reversed. It may be easily demonstrated that $$V_O-V_{OR}=(V_G/V_{UG})\cdot(V_{I+}-V_{I-})$$

where the unity-gain voltage $V_{UG}$ is defined as:

$$V_{UG}=250/(2\cdot R_L)=125/R_L$$

where $V_{UG}$ is in volts and $R_L$ is in ohms.

The choice of resistor value $R_L$, and therefore of the unity-gain voltage $V_{UG}$, is constrained by stability considerations in the op amp feedback loop. Resistors $R_S$ and $R_{SS}$ are provided to limit the differential supply voltage to the AD834 to within its design constraints by providing a voltage drop across the supply resistors proportional to the supply currents drawn by the AD834. Resistors $R_B$ are provided to supply bias current to the AD834's outputs while maintaining the voltage at the AD834's outputs above the positive supply voltage to the AD834, as required for proper open-collector operation. Resistors $R_F$ and capacitors $C_F$ damp out noise oscillations in supply-ground circuits.

Figure 7:
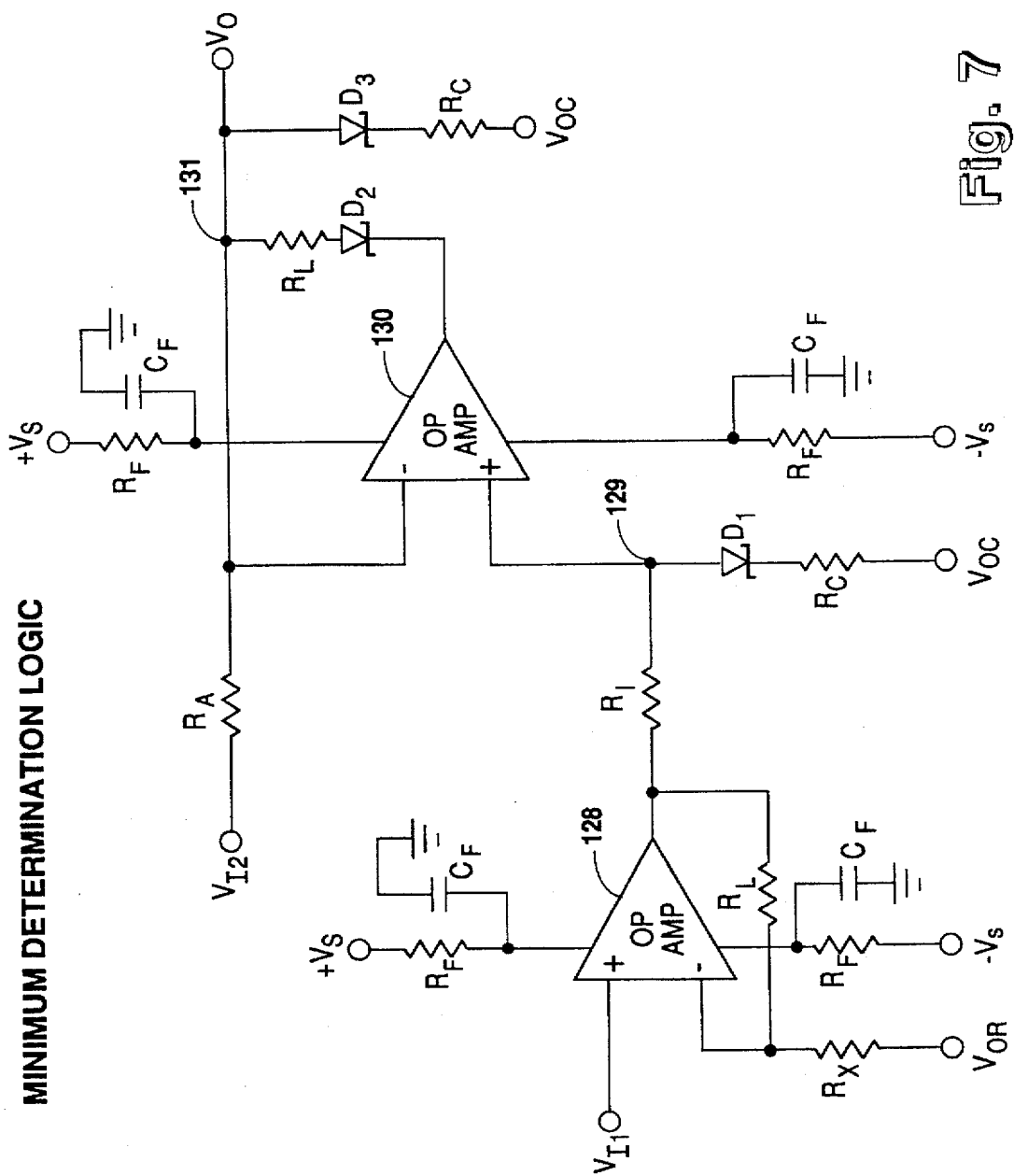
FIG. 7 illustrates minimum determination logic of FIG. 5.

Referring now to FIG. 7, the minimum determination circuit 116 is shown. The signal voltage $V_{I1}$ is connected to the non-inverting input of an operational amplifier (op amp) 128. The op amp 128 is preferably the AD9617 produced by Analog Devices. For information on this op amp, please see the AD9617 data sheet (published by Analog Devices), which is hereby incorporated by reference. The inverting input of the op amp 128 is connected to one terminal of a resistor $R_X$ whose other terminal is connected to the reference voltage $V_{OR}$. The inverting input of the op amp 128 is also connected to one terminal of resistor $R_L$, whose other terminal is connected to the output of the op amp 128. The positive voltage supply of the op amp 128 is connected to one terminal of a resistor $R_F$, whose other terminal is connected to supply voltage $+V_S$, preferably $+5$ volts. The node between the positive supply of the op amp 128 and resistor $R_F$ is also connected through a capacitor $C_F$ to ground. The negative supply of the op amp 128 is connected to one terminal of a second resistor $R_F$ whose other terminal is connected to supply voltage $-V_S$, preferably $-5$ volts. The node between the negative supply of the op amp 128 and resistor $R_F$ is also connected through a capacitor $C_F$ to ground.

The output of the op amp 128 is connected through a resistor $R_I$ to node 129, which is connected to the non-inverting input of an op amp 130. The op amp 130 is preferably the AD9617 produced by Analog Devices. Node 129 is also connected to the anode of Schottky diode $D_1$ whose cathode is connected through a resistor $R_C$ to reference voltage $V_{OC}$. The signal voltage $V_{I2}$ is connected through a resistor $R_A$ to the inverting input of the op amp 130. The positive supply of the op amp 130 is connected through a resistor $R_F$ to $+V_S$, preferably +5 volts. The node between the resistor $R_F$ and the positive supply of the op amp 130 is also connected through a capacitor $C_F$ to ground. The negative supply of the op amp 130 is connected through a resistor $R_F$ to a supply voltage $-V_S$, preferably -5 volts. The node between resistor $R_F$ and the negative supply of the op amp 130 is also connected through a capacitor $C_F$ to ground.

The inverting input of the op amp 130 is connected to a node 131. Node 131 is also connected through a resistor $R_L$ to the anode of diode $D_2$, whose cathode is connected to the output of the op amp 130. Node 131 is further connected to the anode of diode $D_3$, whose cathode is connected through resistor $R_C$ to reference voltage $V_{OC}$. The signal voltage output $V_O$ is connected to node 131.

Op amp 128, preferably an AD9617 as referenced above, is configured as a non-inverting amplifier with gain G, preferably 10. Resistor $R_L$ is chosen for stability of the feedback loop and resistor $R_X$ is chosen to satisfy the relation $R_L/R_X=G-1$. Schottky diode $D_1$ is in conduction when the output of op amp 128 exceeds one Schottky diode drop above clamping voltage reference $V_{oc}$. When diode $D_1$ is not in conduction, the voltage drop across resistor $R_I$ is negligible and therefore the voltage at node 129 is $V_{OR}+(G \cdot (V_{I1}-V_{OR}))$. When diode $D_1$ is in conduction, the sum of the voltage drops across resistors $R_I$ and $R_C$ equals the difference between the output of op amp 128 and $(V_{OC}+V_{DD})$, where voltage $V_{DD}$ is the voltage drop across diode $D_1$. Since the voltage across each resistor is proportional to its resistance, choosing resistor value $R_C$ much less than resistor value $R_I$ limits the excursion at node 129 to a range not much above $(V_{OC}+V_{DD})$, thereby protecting the op amp 130 against excessive differential input voltages.

When the voltage at node 129 is less than voltage $V_{I2}$, Schottky diode $D_2$ is in conduction and sufficient current is drained through resistor $R_A$ to bring the inverting input of the op amp 130 equal to the voltage at node 129, thereby applying a voltage equal to $V_{OR}+(G \cdot (V_{I1}-V_{OR}))$ to output terminal $V_O$. When voltage $V_{I2}$ is less than the voltage at node 129, diode $D_2$ is non-conducting, resulting in an output voltage $V_O$ equal to input voltage $V_{I2}$ for negligible output current drawn through $V_O$. Schottky diode $D_3$ is provided to limit the excursion of $V_O$ to approximately one Schottky diode drop above $V_{OC}$ in order to protect circuitry connected to voltage $V_O$ from transient excursions above this voltage. The capacitors $C_F$ and resistors $R_F$ connected to supply terminals of the op amps are provided to filter out high frequency noise.

By using the dynamic range transform logic 26, 28, and 30, the number of bits required to represent the corresponding pixel values to the desired level of accuracy under different lighting conditions is reduced. Instead of a 12 bit or 16 bit A/D converter, an 8 bit A/D converter can be used, thus enabling the use of a narrower data path throughout, significantly reducing the cost and complexity of later processing stages. In addition, while using the dynamic range transform logic 26, 28, and 30, the maximum useful information is packed into each bit of processed information. Using three different dynamic range transform circuits in the preferred embodiment allows each of the three components to be separately transformable so that the dynamic range can be adjusted for each component according to the lighting conditions prevalent in that frequency range.

Motion Compensation Logic

As discussed in the background, the camera system is subject to vibration due to various environmental influences. The movement or vibration of the camera or camera platform may be separated into vibration around an axis that is approximately parallel to the focal plane and to the ground, viz., swing, and vibration around a vertical axis, viz., sway. The present method does not compensate for vibration around an axis perpendicular to the focal plane.

The camera system is preferably part of a vision based object detection system. The camera system may be mounted in a number of different ways, depending on the respective application of the machine vision system. One application of the camera system requires pole-mounting and subjects the system to motion as a result of environmental influences, resulting in apparent motion in stationary portions of the image. In other applications, such as in robotic manufacturing or in a security system, the camera may be mounted more securely. However, the camera system may still be subject to vibration due to outside influences. With sufficient processing speed, this method compensates even for violent motion, as in wire mounted traffic camera systems.

It is desirable that this apparent motion or "jitter" of stationary portions be eliminated in real time for the machine vision system to correctly discriminate between moving and stationary objects. This is referred to as "swing and sway" removal or motion compensation. In addition, it is important that the camera system be able to minimize the "background" or stationary portions of the image, referred to as background compensation, in real time. The removal of jitter from the image essentially entails computing the correct amount of offset or displacement that the jitter has caused to the image and translating the image by that amount.

One possible way that could be used to compute the offset required to eliminate the effects of camera motion would be to compare every pixel in the frame with a reasonably sized subset of pixels around the respective pixel from an accumulated background frame to find the background pixel that most closely matches the respective pixel's value. This is somewhat similar to the classic "optical flow" calculation as discussed in Mallot et al. referenced in the background portion of the specification.

However, the Mallot reference teaches computation of localized motion and is not concerned with, nor is its method suitable for, determining a global motion component representing displacement between successive images. In particular, a serious problem with attempting to use optical flow estimates to perform motion compensation is that, in practical applications, more than one of the neighboring pixels will match the value of the current pixel, making a large subset of the pixels unusable for making a definitive translation evaluation. In addition, the image will have changed not only position but value due to changes in lighting. Thus, a direct comparison is not adequate for these and other reasons.

Another approach involves computing the differences between the accumulated background frame and the current incoming frame for each pixel position for a reasonable set of coordinate shifts and choosing the shift which yields the lowest (absolute value based) difference as the amount of translation. A disadvantage of this method is that it would require a large amount of processing power for real time results and a large amount of space would be required for the hardware. In addition, this solution would be very expensive due to the processing power and hardware required.

The method according to the present invention is a modification of the second method presented above. In this scheme, the frame is logically divided into a number of blocks large enough to assure that any motion occurring can be detected but small enough that necessary processing can be performed in real time. The simplifying assumption made is that frame rates are high enough and camera motion small enough that the amount of image shift due to camera motion is relatively small compared to the frame size, so only localized comparisons are needed to determine the amount of shift that has occurred.

Another simplification to reduce processing power is that, rather than comparing an incoming pixel with all its neighbors in the corresponding block in the accumulated background frame, the incoming pixel is compared with one pixel in the corresponding block in the background frame. The background pixel chosen is not at the same position in the background block as the incoming pixel's position in its block, but is at an offset or relative displacement from an initial displacement "guess" from the incoming pixel's position in its block.

The initial displacement guess represents a "guess" as to the amount of displacement or offset that vibration has caused to the image. A separate relative displacement is then made from the initial displacement guess for each pixel position in the block as to the amount of image shift that has occurred since the previous frame. By using a different relative displacement for each incoming pixel in each respective block, a range of pixel value differences or error values is computed over the entire block. These different relative displacements are repeated for each of the logical blocks comprising the image, thus producing a number of computed pixel error values for each of the possible relative displacements from the initial displacement guess. These pixel error values are then accumulated for each relative displacement to produce a matrix of accumulated error values. This error matrix is then analyzed to determine which relative displacement results in the best fit of the new frame to the background frame, thus giving the correct amount of translation relative to the initial displacement guess necessary to align the new frame.

Figure 8:
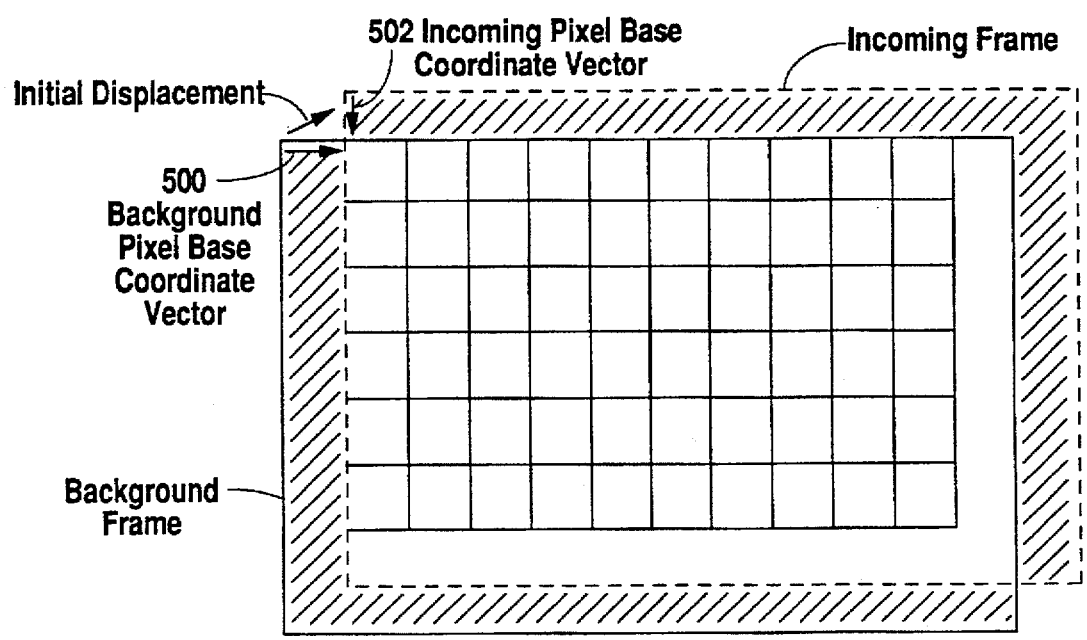
FIG. 8 illustrates an initial displacement guess where the incoming frame is displaced relative to the background frame, as well as conceptual blocks in the overlapping portion of the incoming frame and displaced background frame.

To illustrate the operation of the motion compensation logic 50, assume an initial displacement guess of (12, −3), i.e., an initial displacement guess of 12 pixels (right) in the horizontal direction and −3 pixels (upward) in the vertical direction. Referring now to FIG. 8, it is helpful to conceptualize the incoming frame displaced 12 pixels in the positive horizontal direction and displaced 3 pixels in the negative vertical direction. In this manner, the pixels from the background frame that overlap those in the incoming frame are already displaced by (12, −3) relative to the incoming frame. For example, the pixel located at (0, 3) in the incoming frame overlaps with pixel (12, 0) in the background frame. If a shift of (12, −3) is made from pixel (0, 3) in the incoming frame, this shift would produce pixel (12, 0) in the background frame. Thus, the overlap serves to align the respective incoming and background pixels based on the initial displacement.

In this manner, each respective background pixel that overlaps with the respective incoming pixel is already displaced by (12, −3) from the respective incoming pixel. The pixels from the portion of the background frame and the incoming frame that do not overlap are ignored, i.e., no displacement calculations are made as to these pixels.

Values referred to as $N_x$ and $N_y$ are chosen representing the range of horizontal and vertical relative displacements, respectively, from the initial displacement guess that are to be tested. For example, if $N_x$ is chosen to be 8 and $N_y$ is chosen to be 10, then the range of relative displacements from the initial displacement guess is from (−8, −10) to (+8, +10). The values selected for $N_x$ and $N_y$ also determine the size of the blocks that are formed in the overlapping portion of the incoming and background images. With the range of relative displacements set to $(N_x, N_y)$, the block size is set to $(2N_x+1) \cdot (2N_y+1)$. This provides a number of pixels in each block which matches the number of combinations of relative displacements. For example, with $(N_x, N_y)=(8, 10)$, the block size is $2N_x+1$ by $2N_y+1$ or 17 by 21.

Referring again to FIG. 8, taking the above example of $(N_x, N_y)=(8, 10)$, a plurality of 17 by 21 blocks are formed in the overlapping portion of the two images beginning from the upper left of the overlapping portion. The portion of the overlapping images at the bottom and right of the overlap that is left over is preferably ignored. For example, in a 640×480 image, a displacement of (12, −3) reduces the horizontal length of the overlapping portion of the two images by 12, leaving 628 pixels remaining in which to fit 17×21 blocks. Accordingly, 36 blocks fit horizontally within the overlapping portion of the two images, with the remaining 16 columns of pixels at the right of the overlapped portion left unused. Also, the initial displacement (12, −3) reduces the number of pixels in the vertical direction by 3, leaving 477 pixels remaining. This allows 22 blocks to fit in each column of the image, leaving the 15 rows of pixels at the bottom unused.

In an alternate embodiment, these "throw-away" pixels at the bottom and right portions of the overlapping images are used either with the same relative displacements being used for the corresponding pixels or with a different assignment of relative displacements to these pixels to compensate for the lack of a full 17×21 block. This allows a greater sampling of pixel displacements, but also increases the logic complexity and processing time.

Figure 9:
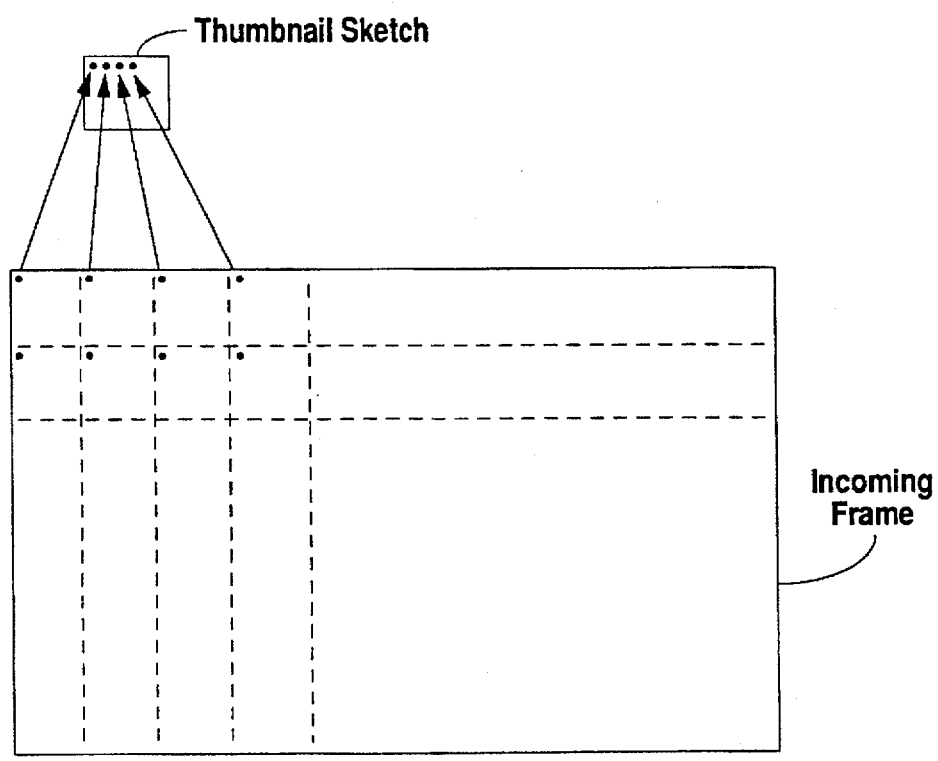
FIG. 9 illustrates a conceptual "thumbnail sketch" of the incoming image where pixels from similarly situated or corresponding positions in each of the blocks form a coarse thumbnail image.

Once this initial displacement guess has been made, then a subsequent relative displacement is made for each of the pixels in each respective conceptual block. This pattern of relative displacements is repeated for the corresponding pixels in each of the conceptual blocks. Referring now to FIG. 9, it is helpful to imagine a number of "thumbnail sketches" of the incoming image where pixels from similarly situated or corresponding positions in each of the blocks are gathered to form separate coarse sketches of the image. For example, where the incoming image is logically partitioned into a plurality of blocks, the pixels in the upper left corner of each block may be gathered to form one thumbnail image, as shown, and so on. Likewise, similarly situated pixels from each of these blocks are coalesced to form corresponding thumbnail sketches. The same relative displacement from the initial displacement guess is made for each pixel in the thumbnail sketch.

In essence, the thumbnail sketches represent a number of very coarse approximations of the image where the granularity of the image is greatly reduced. The same relative displacement from the initial displacement guess is applied to the incoming pixels in a respective thumbnail image to determine the appropriate background pixel with which the incoming pixel is compared. The error values computed between the incoming pixels at this position in the block and the respective displaced background pixels are accumulated in the error matrix for analysis to determine the best relative displacement.

The choice of which relative displacement should be used for each respective pixel location in a respective block represents a design choice that includes a number of factors. For example, it is desirable that the displaced background coordinates for each incoming pixel reside in the same corresponding block in the background frame as in the incoming frame. This maps incoming pixels compactly into the background image while avoiding boundary problems at the edges of the overlap area. One possibility, desirable on grounds of statistical uniformity, is to use a truly random assignment of relative displacement values for respective pixel locations in a block. It is, however, important that each background pixel be used once and only once for more robust calculations minimally affected by noise in the background image. Also, it is preferred that the pattern of relative displacements be symmetrical to limit systematic errors due to brightness gradients across the image.

Figure 10:
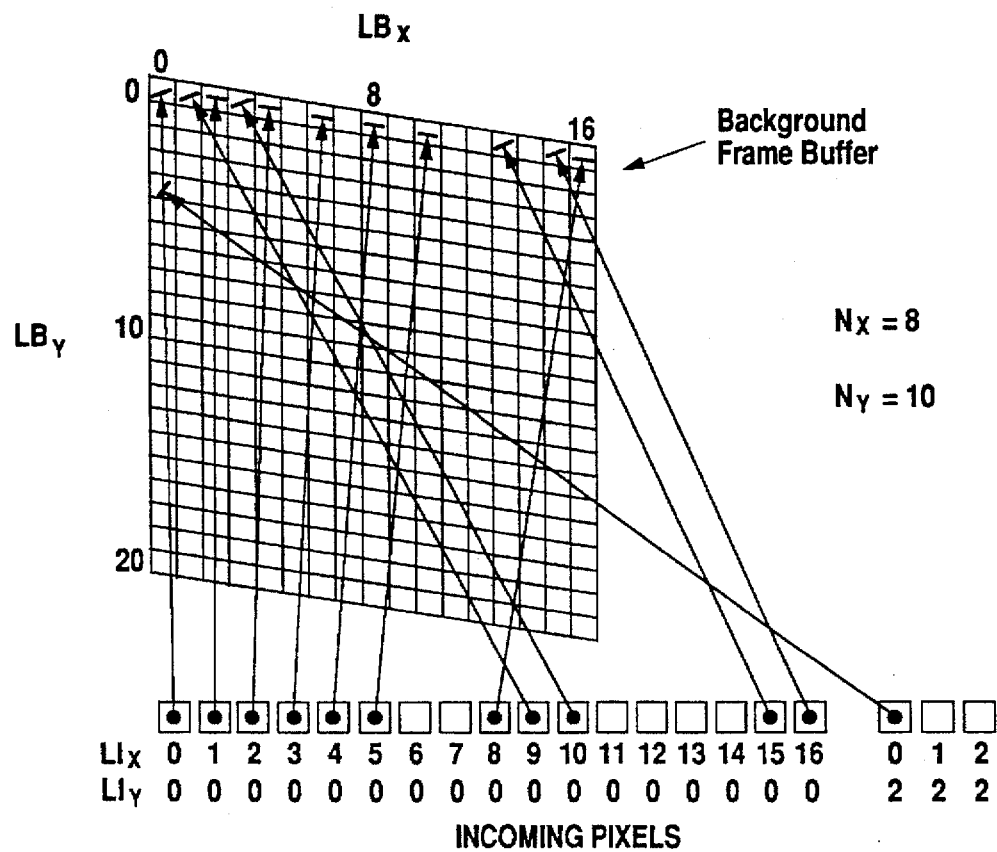
FIG. 10 illustrates pairing of incoming pixels with displaced background pixels within corresponding conceptual blocks.
Figure 11:
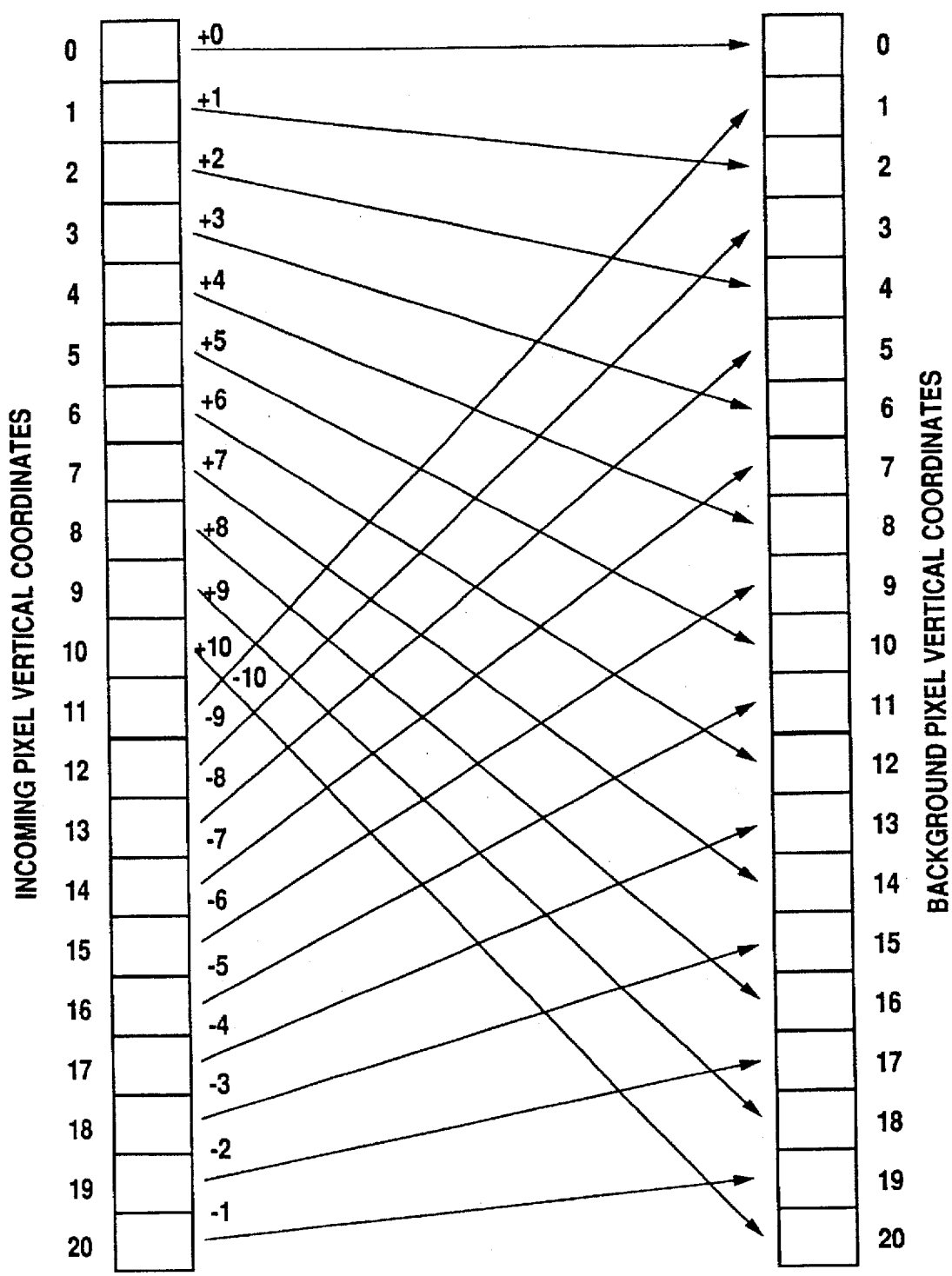
FIG. 11 illustrates the pairing of incoming pixels with displaced background pixels in the vertical dimension.

In the preferred embodiment, the formula for computing the background pixel coordinates within a block that is to be compared with a respective incoming pixel at ($LI_x$, $LI_y$) within the corresponding incoming block is ($2LI_x$ mod ($2N_x+1$), $2LI_y$ mod ($2N_y+1$)). Referring now to FIG. 10, a diagram illustrating the pairing of incoming pixels with background pixels within corresponding 17 by 21 blocks is shown. FIG. 11 illustrates this pairing in the vertical dimension (21 incoming pixels) along with the relative displacement values for each pair (signed arrow labels).

The value of each incoming pixel is compared with the value of the background pixel at coordinates displaced by the initial displacement guess and the appropriate relative displacement. This comparison is performed according to an application-specific difference formula as described below in the description of FIGS. 14A and 14B. The result is accumulated into an error matrix that is the size of the conceptual blocks, 17×21 in our example. The results of this comparison for the pixels in each of the blocks are accumulated in the error matrix to produce an accumulated error value that represents the accumulated differences in value between the incoming pixels and the background pixels whose coordinates are offset by the initial and relative displacements. Once every pixel in a conceptual block in the incoming frame is compared against a displaced background pixel and the results are accumulated, the best relative displacement to compensate for camera jitter is derived from the error matrix.

Figure 12:
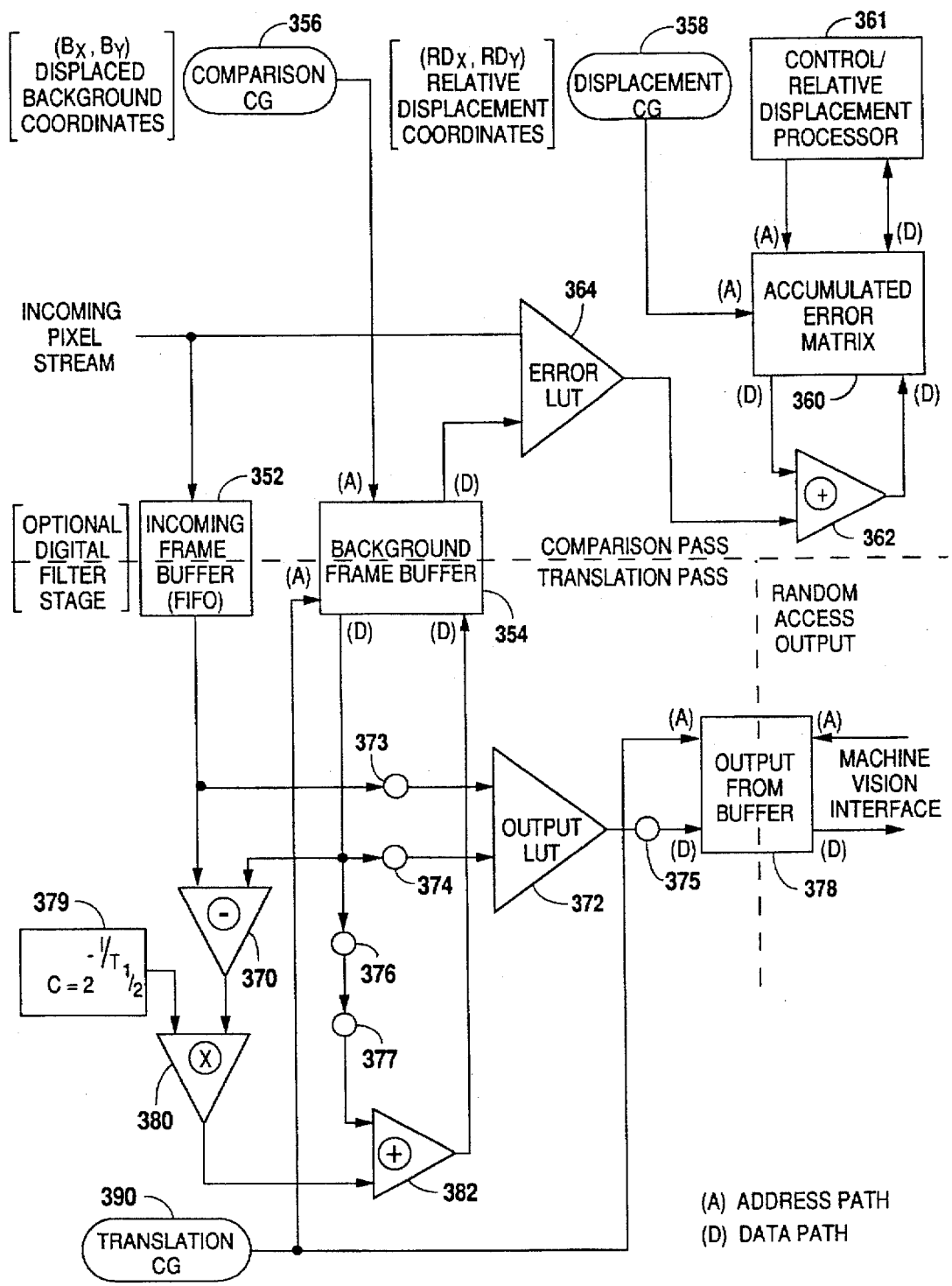
FIG. 12 is a block diagram of motion compensation logic according to the present invention.

The motion compensation logic 50 requires the accumulated background video frame, which is stored in a background frame buffer, and the current video frame, referred to as the incoming frame, in order to compute the amount of translation needed to eliminate the effects of camera motion. Referring now to FIG. 12, the motion compensation logic 50 includes an incoming frame buffer 352 which is organized as a first in first out (FIFO) buffer. The incoming frame buffer 352 receives the raster scan pixels from the HSV transform logic. The motion compensation logic 50 also includes a background frame buffer 354 used to store the accumulated background image. A coordinate generator (CG) 356 is included which provides an address input to the background frame buffer 354. The CG 356 performs addressing functions to select the appropriate displaced pixels in the background frame buffer 354 that are to be compared against incoming pixels provided to the incoming frame buffer 352. This selection is made using the initial displacement guess and the respective relative displacement guess for the respective incoming pixel as previously discussed.

Another coordinate generator (CG) 358 is included which provides an address input to an error matrix 360. The CG 358 provides the x, y relative displacement coordinates relating pairs of pixels being compared and is used to access locations in the error matrix 360. As previously discussed, the error matrix 360 is a $2N_x+1$ by $2N_y+1$ matrix which includes a position for each of the relative displacements which are imposed relative to the initial displacement guess. In the example described above, where ($N_x$, $N_y$)=(8, 10) and the incoming image was portioned into logical 17 by 21 blocks, the error matrix 360 is a 17 by 21 matrix with locations representing each of the relative displacements that are assigned to incoming pixels in a respective block. The error matrix 360 is used to accumulate the pixel value differences (error values) between the displaced background pixel and the incoming pixel. The error matrix 360 provides a data output to adder 362 which in turn provides a data output back to the error matrix 360.

The incoming pixel value and the displaced background pixel value selected from the background frame buffer 354 are provided to a look-up table 364 whose output is provided to the adder 362. The look-up table computes an application-specific difference function of the incoming pixel and the selected displaced background pixel and provides the result to the adder 362, and this error value is then accumulated in the error matrix 360. The difference computed by the look-up table may be either the algebraic absolute difference or another type of difference computation as discussed below in the description of FIGS. 14A and 14B.

A processor 361 coupled to the error matrix 360 analyzes the error matrix 360 and determines the relative displacement ($RD_x$, $RD_y$) that best compensates for camera motion or jitter. As shown in FIG. 15, the best relative displacement will lie at a local minimum of the error matrix but may not be the global minimum due to congruence of adjacent background features that may occur. The method of the preferred embodiment for calculating the best relative displacement is described below in the description of step 422 of FIGS. 14A and 14B. The best relative displacement ($RD_x$, $RD_y$) and the initial displacement ($ID_x$, $ID_y$) are combined to form a total displacement. The total displacement can be represented by coordinates ($TD_x$, $TD_y$) where ($TD_x$, $TD_y$)= ($ID_x+RD_x$, $ID_y+RD_y$).

Figure 13:
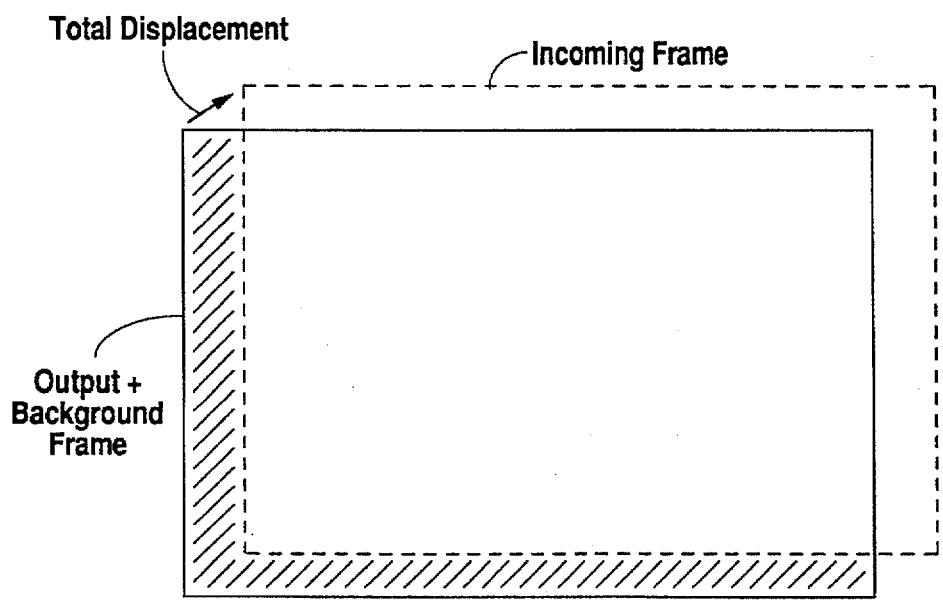
FIG. 13 illustrates application of the total displacement to the incoming frame during the output generation stage of the motion compensation logic.

The incoming frame buffer 352 provides an output pixel stream identical to its input stream, but merely delayed by one frame period. In an alternate embodiment, incoming frame buffer 352 also performs a digital filtering stage on its input stream to reduce high-frequency noise or "snow" in its input data. The output stream is provided to a subtractor unit 370 and is further provided through a delay element 373 to a look-up table 372. The background frame buffer 354 provides an output to the subtractor 370 and also through a delay element 374 to the look-up table 372. The choice of background pixel conveyed to the background frame buffer's output is determined by the coordinates output from the CG 390. For incoming pixels at coordinates ($I_x$, $I_y$) in the overlap region of FIG. 13, these coordinates are ($I_x+TD_x$, $I_y+TD_y$), which equals the coordinates of the incoming pixel being processed plus the total displacement computed above.

The subtractor 370 subtracts the input it receives from the background frame buffer 354 from the input it receives from the incoming frame buffer 352 and provides the output to a multiplier 380. The second input to the multiplier 380 is a constant C stored in register 379 such that 0<C<1. The value in register 379 may be modified between frames by processor 361. The output of the multiplier 380 is provided to an adder 382. The background frame buffer 354 also provides an output through delay elements 376 and 377 to the adder

382. The output of the adder 382 produces a new background according to the equation:

$$B_{new} \leftarrow B \cdot (1-C) + I \cdot C$$

Therefore, each individual frame's contribution to the background decays exponentially as it is repeatedly multiplied by the quantity (1–C). The above equation may also be written as:

$$B_{new} \leftarrow B + (I-B) \cdot C$$

C is related to the half-life of the decay of background features by the expression $C=2^{(-1/T_{1/2})}$. The constant C provides an exponential decay factor to average the image with the stationary background removed, this being I–B, with the previously computed background. This new background pixel value is output from the adder 382 and provided to the background frame buffer 354 to be stored as the newly computed background. This new background is stored at the same coordinate location from which the old background pixel was fetched as described above.

The LUT 372 generates a difference value as a function of its two inputs. The choice of difference function is application-specific and is similar to the error function LUT 364 described above. The LUT 372 provides its output through delay element 375 to an output buffer 378. CG 390 provides the same coordinates to the output buffer 378 as are provided to the background frame buffer 354. This produces an output image with the stationary background features removed. The output image is accessed by the machine vision system into which the camera system is incorporated through a random access port to the output frame buffer 378.

For incoming pixels outside the overlap region, the incoming pixel is discarded while a constant pixel value is stored in the output buffer 378 at coordinates (($I_x$+$TD_x$) mod (frame width), ($I_y$+$TD_y$) mod (frame height)). This represents placing this constant pixel value in the nonoverlapping portion represented in FIG. 13 by the dashed region. In most applications, this constant pixel value should be 0, representing no difference between incoming and background frames at that location. No background update is performed on these non-overlapping locations.

Figure 14A:
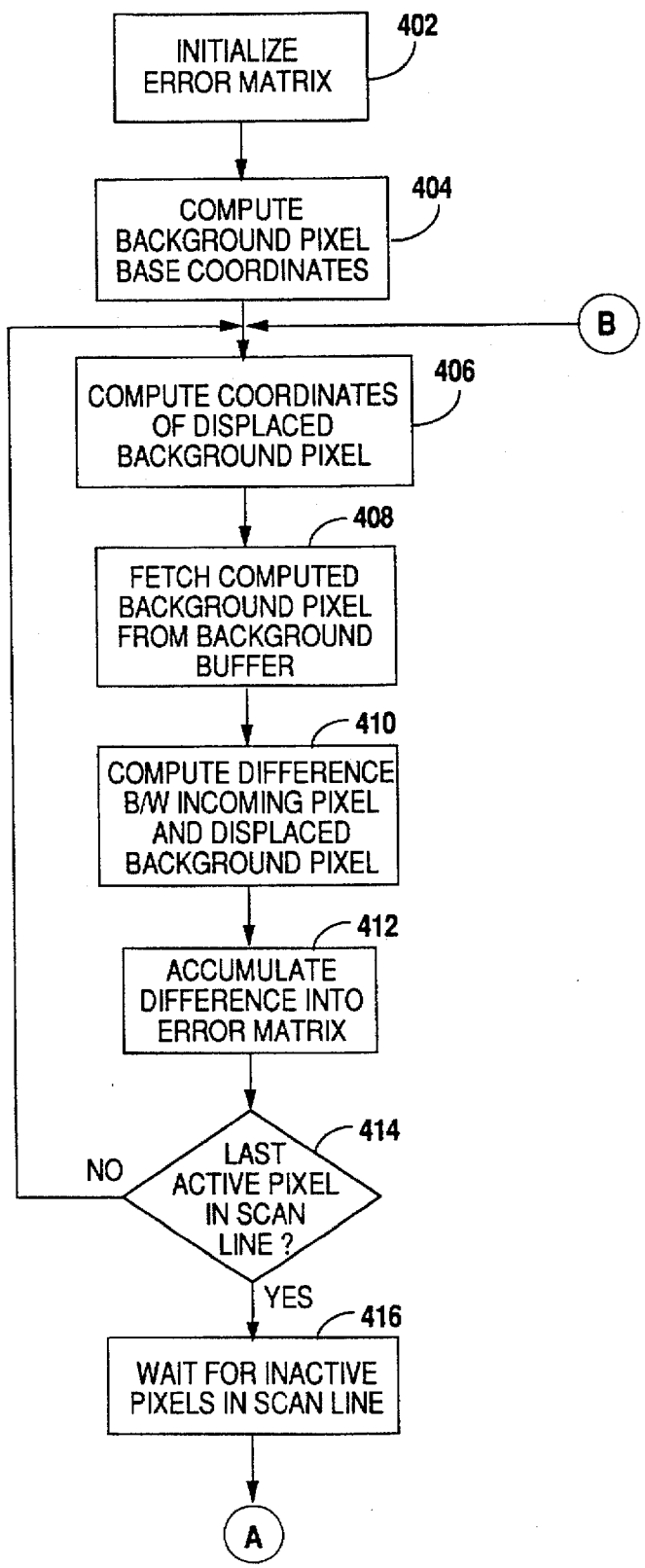
FIGS. 14A and 14B are flowchart diagrams illustrating operation of the motion compensation logic of FIG. 12.
Figure 14B:
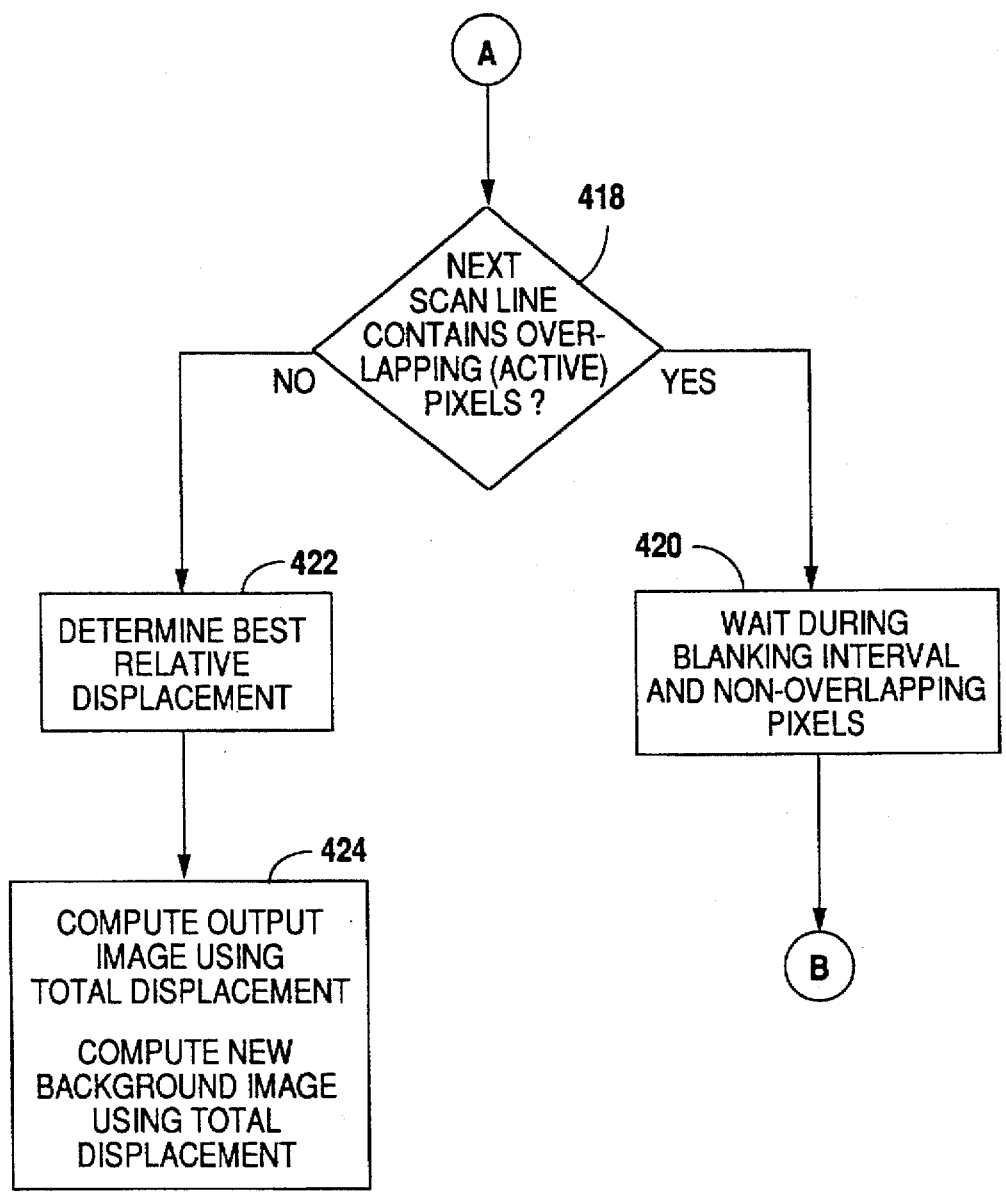
Figure 15:
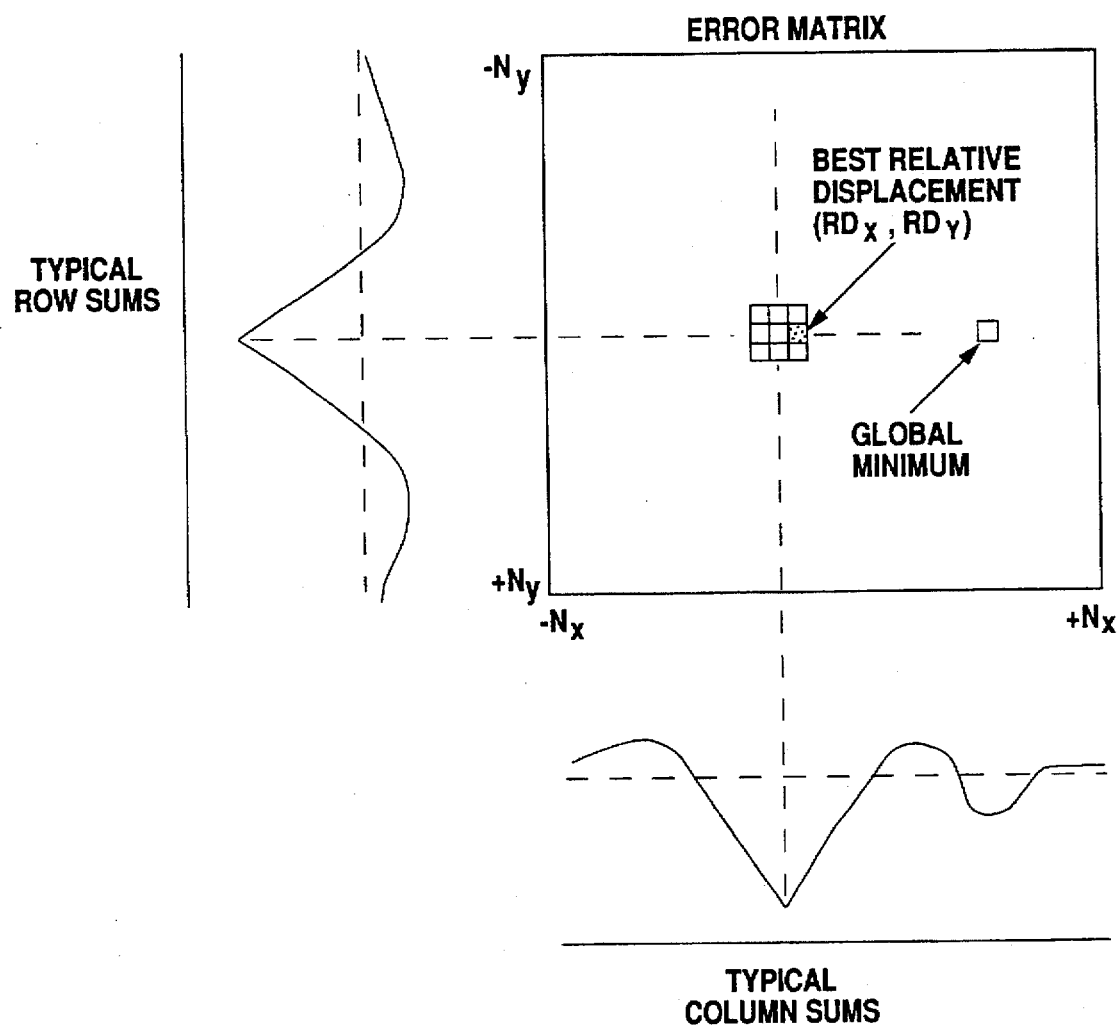
FIG. 15 is a graph illustrating the contents of the error matrix after a sample comparison pass and a method of determining from this matrix the correct relative displacement to use during the translation pass of the method.

Referring now to FIGS. 14A and 14B, the method which computes the correct amount of displacement required to compensate for jitter is shown. In step 402, the method initializes the contents of the error matrix 360 to zero. In step 404, the method computes the background pixel base coordinates. These coordinates are the coordinates of the top left corner of the overlap region in the background frame and are based on the initial displacement guess as follows. The background pixel base coordinates are illustrated by reference numeral 500 in FIG. 8. The background base x coordinate is the greater of the initial x displacement guess and zero. Likewise, the background base y coordinate is the greater of the initial y displacement guess and zero. In the example discussed above using an initial displacement guess of (12, –3), the background base coordinates are (12, 0). This determination is essentially equivalent to overlapping the incoming frame onto the background frame based on the initial displacement guess as illustrated in FIG. 8.

The CG 356 delays the start of processing until the top left corner of the overlap region of the incoming pixel frame appears in the raster scan. This corresponds to incoming base x and y coordinates equal to the background base x and y coordinates minus the initial x and y displacement guesses, as illustrated by reference numeral 502 in FIG. 8. In the example discussed above, the incoming base coordinates are (0, 3). Thus, the initial displacement guess is incorporated into the coordinate calculations at the beginning of the processing of a frame. All coordinate calculations, i.e., the computing of the coordinates of the appropriate background pixels using the relative displacement pattern, are performed relative to these base coordinates.

In step 406, the method computes the coordinates of the appropriate background pixel to be compared against the incoming pixel using a relative displacement based on the incoming pixel number. The overlap region can be logically divided into blocks $2N_x+1$ by $2N_y+1$. Pixels within each of these blocks in the incoming frame are compared with displaced pixels within the corresponding block in the background frame. The correspondence of incoming pixels to background pixels within corresponding blocks is illustrated in FIG. 10. In the following equations, $LI_x$ and $LI_y$ are the coordinates of an incoming pixel relative to the top left corner of the incoming block containing it. Also, $LB_x$ and $LB_y$ are the coordinates of a background pixel relative to the top left corner of the background block containing it.

$$LB_x = (2 \cdot LI_x) \bmod (2 \cdot N_x + 1)$$

$$LB_y = (2 \cdot LI_y) \bmod (2 \cdot N_y + 1)$$

Since block widths are shorter than the number of pixels in a scan line and pixels are received from the A/D converter 36 or HSV logic 40 in raster scan sequence, background pixel coordinates are generated a row at a time for successive blocks having pixels within the same scan line.

The relative displacement chosen for each pixel is such that a difference or error value is computed for every pixel in the background frame block which overlaps with a respective incoming pixel; i.e., there is a one-to-one matching of background pixels and incoming pixels for each block. The coordinates of the background pixel value that is subtracted from the incoming pixel value is computed based on the position of the incoming pixel in the data stream from the camera.

In step 408, the method fetches the respective background pixel from the background frame buffer 354. In step 410, the method computes the difference between the incoming pixel and the displaced background pixel using the look-up table 364. This difference can be computed in a number of ways, including $|I-B|$, $|(I)^2-(B)^2|$, and $(I-B)^2$. In step 412 the method accumulates this computed difference into the entry in the error matrix 360 corresponding to the relative displacement coordinates ($LB_x-LI_x$, $LB_y-LI_y$). In step 414 the method determines if the last pixel contained in the active region (the union of the conceptual blocks) in the respective scan line has been reached. If not, the method returns to step 406 and repeats steps 406–412 for the next pixel in the scan line. Alternatively, step 414 can be performed prior to step 406, wherein the method determines if an incoming pixel is an active pixel and then processes only active pixels in steps 406–412.

If the last pixel contained in the active region of the respective scan line has been reached in step 414, then the method advances to step 416 and waits during the remaining pixels in the scan line. In step 418, the method determines whether the next scan line comprises pixels within the active region. If so, the method waits during the horizontal blanking interval and any non-overlapping pixels at the start of the next scan line in step 420. The method then returns to step 406 to compare pairs of incoming and background pixels in the next scan line.

If the next scan line does not contain pixels within the active region, then the pixel comparison-pass has been completed for the respective frame, and the method advances to step 422. Once error values have been obtained for each of the respective pixels in the incoming image, i.e., all blocks have been examined, then in step 422, the method determines the correct amount of relative displacement to be used in generating the output frame. This relative displacement combined with the initial displacement, the total displacement, represents the correct amount of offset or displacement by which the image should be translated to compensate for camera motion or jitter.

The method of the preferred embodiment which determines the best relative displacement to compensate for camera jitter sums up the error matrix by rows and by columns. FIG. 15 illustrates plots of the typical form of sums of rows and columns. The method then determines the row with the minimum error and the column with the minimum error. The method then finds the minimum error value within +/−1 relative displacement in each dimension from the intersection of the minimum row and column. As described above, this local minimum may not be the global minimum due to feature congruence effects and artifacts of the relative displacement pattern used in step 406. This method is relatively simple and has proven reliable on sample data. Other methods may of course also be used without affecting the operation of the remainder of the method.

The total displacement is used in computing the output image in step 424. The manner in which the output image is computed was described above. This output may then be provided to a machine vision system (not shown) for further processing, such as object detection or recognition, and possibly object tracking. The total displacement is also used in determining the new background image stored in the background frame buffer 354 in step 424. The computation of the new background is performed as described above in raster scan sequence.

In the preferred embodiment, the total displacement is also used as the initial displacement guess for the next frame. More sophisticated methods of predicting the next initial displacement may be implemented based on application specific knowledge of the motions to which the camera is susceptible. Upon start-up, the initial displacement and background frame are supplied by an application-specific algorithm. Typically these quantities are derived from the first frame captured and stored knowledge about the reference coordinate system.

Therefore, the motion compensation logic 50 translates an incoming image in two dimensions to compensate for and eliminate the effects of camera movement and to minimize stationary "background" features in the frame once the translation has been performed. The logic first compensates for motion and uses the results of that operation in background compensation. The basic concept behind the motion compensation logic is that a sufficient portion of the image is unchanged from frame to frame to allow the logic to analyze the image and determine how much camera motion has occurred. A simplifying assumption is that the image can be analyzed as if motion is in the plane of the image sensor with no rotational component around an axis perpendicular to the focal plane. However, it is noted that additional techniques can be developed to compensate for the rotational component of the motion.

The image is divided into a plurality of image subsets or conceptual blocks and the difference computed between the incoming and background pixel at respective locations in each of the blocks is summed to produce a matrix of accumulated error values. The system then analyzes this error matrix to determine the proper amount of relative displacement which may then be added to the initial displacement to determine the proper amount of translation necessary to align the new frame and thus remove the effect of camera motion or jitter.

The foregoing description of the invention is illustrative and explanatory thereof, and various changes in the methods and apparatus may be made without departing from the spirit of the invention.

What is claimed is:

1. A video preprocessing system for use in machine vision systems, comprising:

receiving means for receiving electromagnetic radiation of varying frequencies from a scene and for producing infrared, visible, and ultraviolet signals corresponding to the infrared, visible, and ultraviolet portions, respectively, of said electromagnetic radiation;

first, second, and third dynamic range transform means receiving said infrared, visible, and ultraviolet signals, respectively, for companding the dynamic range of said received infrared, visible and ultraviolet signals to produce dynamic range companded infrared, visible, and ultraviolet signals; and means receiving said dynamic range companded infrared, visible, and ultraviolet signals for producing a composite output image using each of said companded infrared, visible, and ultraviolet signals.

2. The video preprocessing system of claim 1, wherein each of said dynamic range transform means expands a portion of the dynamic range of said received infrared, visible, and ultraviolet signals into a first portion of the dynamic range of said companded signals and compresses the remainder of the dynamic range of said received infrared, visible, and ultraviolet signals into a second portion of the dynamic range of said companded signals.

3. The video preprocessing system of claim 2, wherein said received infrared, visible, and ultraviolet signals comprise incoming pixel values, wherein each of said dynamic range transform means maps incoming pixel values below a pixel value knee level to higher pixel value levels according to a first gain and maps incoming pixel values above said pixel value knee level to pixel values according to a second incremental gain, wherein said first gain is greater than said second incremental gain.

4. The video preprocessing system of claim 3, wherein said incoming pixel values below said pixel value knee level have a first range and said incoming pixel values above said pixel value knee level have a second range, wherein each of said dynamic range transform means expands the first range of pixel values below said pixel value knee level according to said first gain and compresses the second range of said pixel values above said pixel value knee level by said second incremental gain.

5. The video preprocessing system of claim 1, further comprising:

motion compensation means receiving portions of said output image for adjusting said output image to compensate for jitter caused by environmental influences on the system.

6. A video preprocessing system for use in machine vision systems, comprising:

a charge coupled device grid receiving electromagnetic radiation of varying frequencies from a scene and for producing infrared, visible, and ultraviolet signals corresponding to the infrared, visible, and ultraviolet portions, respectively, of said electromagnetic radiation;

first, second, and third dynamic range transform adjusters receiving said infrared, visible, and ultraviolet signals, respectively, for companding the dynamic range of said received infrared, visible and ultraviolet signals to produce dynamic range companded infrared, visible, and ultraviolet signals; and wherein said dynamic range companded infrared, visible, and ultraviolet signals are used to produce a composite output image using each of said infrared, visible, and ultraviolet companded signals.

7. The video preprocessing system of claim 6, wherein each of said dynamic range transform adjusters expands a portion of the dynamic range of said received infrared, visible, and ultraviolet signals into a first portion of the dynamic range of said companded signals and compresses the remainder of the dynamic range of said received infrared, visible, and ultraviolet signals into a second portion of the dynamic range of said companded signals.

8. The video preprocessing system of claim 7, wherein said received infrared, visible, and ultraviolet signals comprise incoming pixel values, wherein each of said dynamic range transform adjusters maps incoming pixel values below a pixel value knee level to higher pixel value levels according to a first gain and maps incoming pixel values above said pixel value knee level to pixel values according to a second incremental gain, wherein said first gain is greater than said second incremental gain.

9. The video preprocessing system of claim 8, wherein said incoming pixel values below said pixel value knee level have a first range and said incoming pixel values above said pixel value knee level have a second range, wherein each of said dynamic range transform adjusters expands the first range of pixel values below said pixel value knee level according to said first gain and compresses the second range of said pixel values above said pixel value knee level by said second incremental gain.

10. The video preprocessing system of claim 6, further comprising:

a motion compensator receiving portions of said output image for adjusting said image to compensate for jitter caused by environmental influences on the system.

11. A method for performing video preprocessing, comprising:

receiving electromagnetic radiation of varying frequencies from a scene;

producing infrared, visible, and ultraviolet signals corresponding to the infrared, visible, and ultraviolet portions, respectively, of said electromagnetic radiation;

separately companding the dynamic range of each of said infrared, visible and ultraviolet signals to produce dynamic range companded infrared, visible and ultraviolet signals; and producing a composite output image using each of said companded infrared, visible, and ultraviolet signals.

12. The method claim of claim 11, wherein said infrared, visible, and ultraviolet signals comprise incoming pixel values and said separately companding comprises mapping incoming pixel values below a pixel value knee level to higher pixel value levels according to a first gain and mapping incoming pixel values above said pixel value knee level to pixel values according to a second incremental gain, wherein said first gain is greater than said second incremental gain.

13. The method of claim 12, wherein said incoming pixel values below said pixel value knee level have a first range and said incoming pixel values above said pixel value knee level have a second range, wherein said separately companding comprises expanding the first range of pixel values below said pixel value knee level according to said first gain and compressing the second range of said pixel values above said pixel value knee level by said second incremental gain.

14. A video preprocessing system for use in machine vision systems, comprising:

video source means for receiving electromagnetic radiation of varying frequencies from a scene and for producing signals representing an image, wherein said signals have a dynamic range, wherein said signals correspond to two or more of the infrared, visible, and ultraviolet portions of said electromagnetic radiation;

dynamic range transform means receiving said signals and for companding the dynamic range of said signals and for producing dynamic range companded signals, wherein said dynamic range transform means expands a portion of the dynamic range of said signals into a first portion of the dynamic range of said companded signals and compresses the remainder of the dynamic range of said signals into a second portion of the dynamic range of said companded signals; and means for receiving said companded signals and for producing a composite output image based on said companded signals.

15. The video preprocessing system of claim 14, further comprising:

motion compensation means receiving said companded signals for adjusting said image to compensate for jitter caused by environmental influences on the system.

16. A video preprocessing system for use in machine vision systems, comprising:

a charge coupled device grid for receiving electromagnetic radiation of varying frequencies from a scene and for producing signals corresponding to two or more of the infrared, visible, and ultraviolet portions of said electromagnetic radiation, said signals having a dynamic range;

a dynamic range transform adjuster receiving said signals for companding the dynamic range of said signals and for producing dynamic range companded signals, wherein said dynamic range transform adjuster expands a portion of the dynamic range of said signals into a first portion of the dynamic range of said companded signals and compresses the remainder of the dynamic range of said signals into a second portion of the dynamic range of said companded signals; and wherein said companded signals are used to produce a composite output image based on said companded signals.

17. A method for performing video preprocessing, comprising:

receiving electromagnetic radiation of varying frequencies from a scene and producing signals corresponding to two or more of the infrared, visible, and ultraviolet portions of said electromagnetic radiation, said signals having a dynamic range;

companding the dynamic range of said signals to produce dynamic range companded signals after said step of receiving, wherein said step of companding expands a portion of the dynamic range of said signals into a first portion of the dynamic range of said companded signals and compresses the remainder of the dynamic range of said signals into a second portion of the dynamic range of said companded signals; and producing a composite output image based on said companded signals.

* * * * *